(12) United States Patent
Kang et al.

(10) Patent No.: US 9,851,886 B2
(45) Date of Patent: Dec. 26, 2017

(54) METHOD AND APPARATUS FOR DISPLAYING PAGE IN TERMINAL

(71) Applicant: Samsung Electronics Co., Ltd., Gyeonggi-do (KR)

(72) Inventors: Doosuk Kang, Gyeonggi-do (KR);
Changho Lee, Gyeonggi-do (KR);
Saemee Yim, Gyeonggi-do (KR);
Jeehye Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 539 days.

(21) Appl. No.: 14/530,106

(22) Filed: Oct. 31, 2014

(65) Prior Publication Data

US 2015/0128087 A1  May 7, 2015

(30) Foreign Application Priority Data

Nov. 1, 2013  (KR) .................. 10-2013-0132017

(51) Int. Cl.
*G06F 3/00* (2006.01)
*G06F 3/0485* (2013.01)
*G06F 3/0488* (2013.01)

(52) U.S. Cl.
CPC ........ *G06F 3/0485* (2013.01); *G06F 3/04883* (2013.01)

(58) Field of Classification Search
CPC ... G06F 3/0482; G06F 3/04883; G06F 3/0485
USPC ......................... 715/784, 787, 822
See application file for complete search history.

(56) References Cited

U.S. PATENT DOCUMENTS

| 2005/0114791 | A1* | 5/2005 | Bollenbacher ........ G06F 3/0485 715/787 |
| 2009/0228825 | A1 | 9/2009 | Van Os et al. |
| 2013/0246970 | A1* | 9/2013 | Helle .................... G06F 3/0482 715/822 |
| 2014/0215382 | A1* | 7/2014 | Engel .................. G06F 3/04883 715/784 |

* cited by examiner

*Primary Examiner* — Haoshian Shih
(74) *Attorney, Agent, or Firm* — The Farrell Law Firm, P.C.

(57) ABSTRACT

A method of displaying a page is provided, which includes sensing an input for moving a page; determining an available scroll distance according to the sensed input; and displaying a Graphic User Interface (GUI) based on the available scroll distance and a currently displayed position of the page.

18 Claims, 18 Drawing Sheets

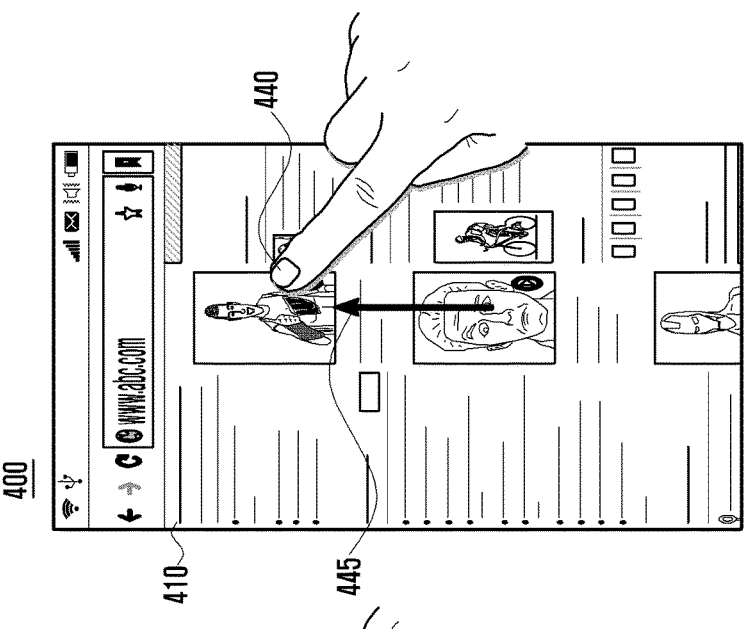
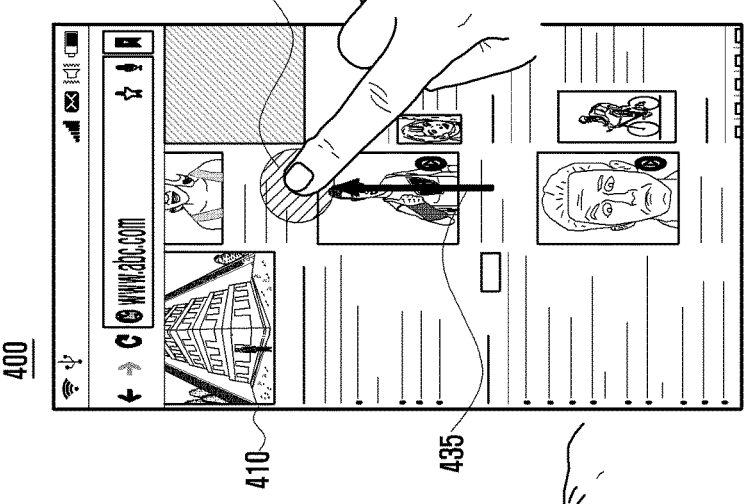
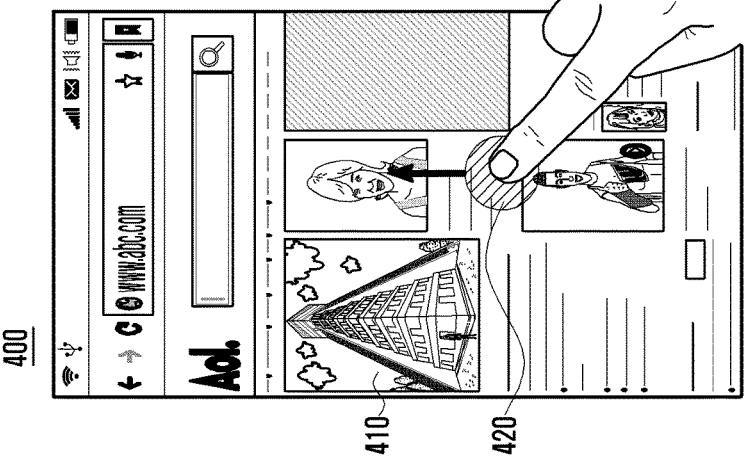

METHOD AND APPARATUS FOR DISPLAYING PAGE IN TERMINAL

PRIORITY

This application claims priority under 35 U.S.C. §119(a) to Korean Patent Application No. 10-2013-0132017, filed in the Korean Intellectual Property Office on Nov. 1, 2013, the entire content of which is incorporated herein by reference.

BACKGROUND OF THE INVENTION

1. Field of the Invention

The present invention relates generally to a method and an apparatus for displaying a Graphic User Interface (GUI), which includes one or more of a search window and a Uniform Resource Locator (URL) input window and which is not displayed on a display unit of a terminal, but is displayable in response to an input by a user in the terminal.

2. Description of the Related Art

In a terminal, at least one of the GUIs, which include one or more of a search window and a URL window, and which are additionally displayable on a display unit of the terminal, are hidden when an application displays a page due to the limited size of a display unit. Accordingly, a method and an apparatus for displaying a GUI, which is additionally displayable, are needed.

SUMMARY OF THE INVENTION

The present invention has been made to address at least one of problems and/or disadvantages described above and to provide at least the advantages described below.

Accordingly, an aspect of the present invention provides a method and an apparatus for displaying a GUI, which are capable of displaying an additionally displayable GUI in response to an input by a user for a movement of a page.

Another aspect of the present invention provides a method and an apparatus for displaying a window for an input even without repeat of an unnecessary screen movement motion or performance of a separate touch input in order to display an additionally displayed GUI during the use of the terminal by a user, thereby improving usability for the user.

In accordance with an aspect of the present invention, a method of displaying a page is provided. The method includes sensing an input for moving a page; determining an available scroll distance according to the sensed input; and displaying a Graphic User Interface (GUI) based on the available scroll distance and a currently displayed position of the page.

In accordance with another aspect of the present invention, a terminal for displaying a page is provided. The terminal includes an input unit configured to sense an input for moving a page displayed on a display unit of the terminal or an external display unit connected with the terminal; and a controller configured to determine an available scroll distance according to the sensed input, and to display a GUI based on the available scroll distance and a currently displayed position of the page.

BRIEF DESCRIPTION OF THE DRAWINGS

The above and other aspects, features and advantages embodiments of the present invention will be more apparent from the following detailed description, taken in conjunction with the accompanying drawings, in which:

FIGS. 4A to 4C are diagrams illustrating one example of a scroll method according to an embodiment of the present invention;

DETAILED DESCRIPTION OF EMBODIMENTS OF THE PRESENT INVENTION

Figure 1:
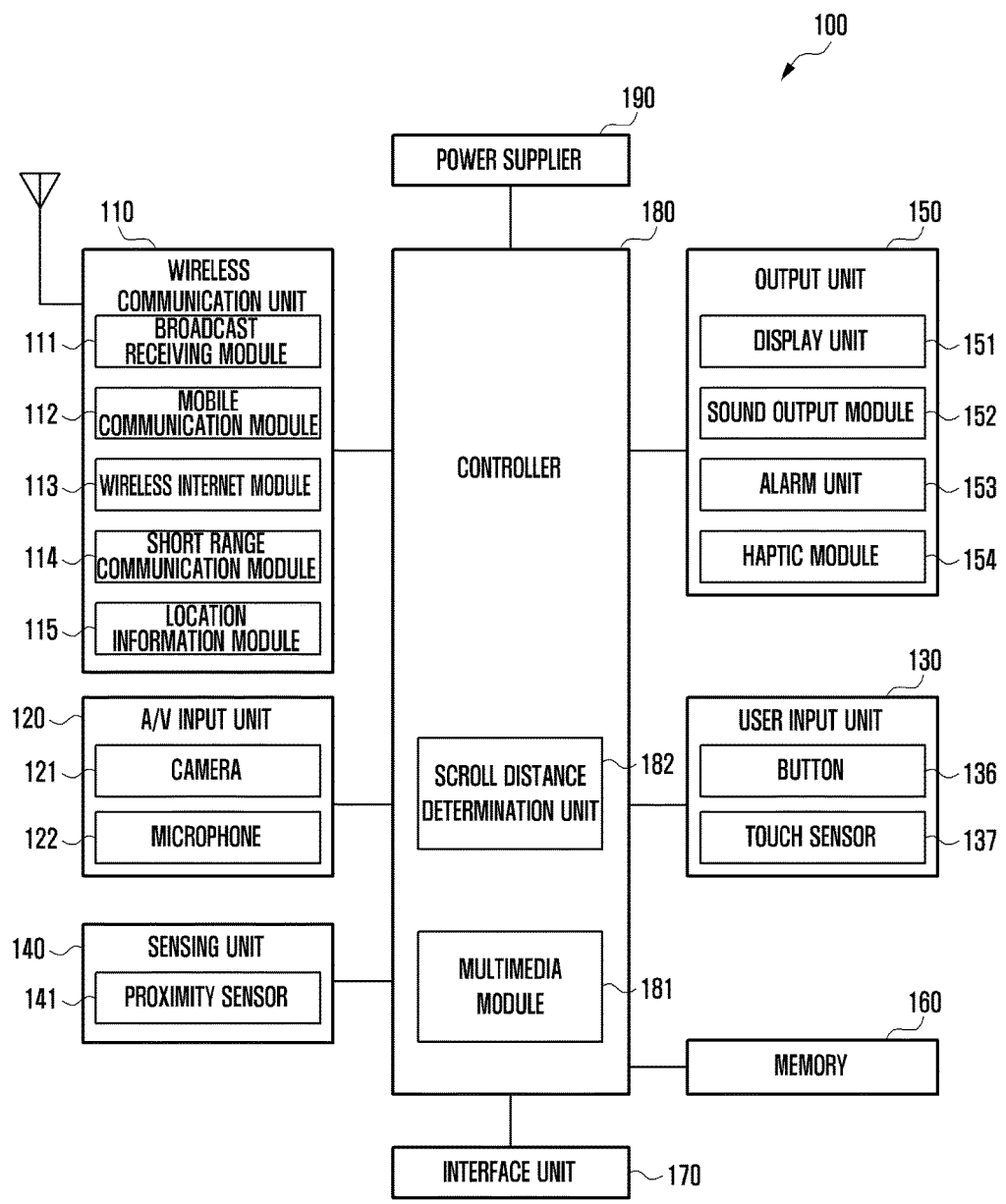
FIG. 1 is a block diagram illustrating a configuration of a terminal according to an embodiment of the present invention.

Hereinafter, various embodiments of the present invention will be described in detail with reference to the accompanying drawings. In describing the embodiments of the present invention, descriptions related to technical contents which are well-known in the art to which the present invention pertains, and are not directly associated with the present invention, will be omitted. Such an omission of unnecessary descriptions is intended to prevent obscuring the main idea of the present invention.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may not occur in the specific order. For example, two blocks shown in succession may in fact be executed substantially concurrently or the blocks may sometimes be executed in the reverse order, depending upon the functionality involved.

The terms "unit" or "module" refer to a software element or a hardware element, such as a Field Programmable Gate Array (FPGA) or an Application Specific Integrated Circuit (ASIC), which performs a predetermined function. However, the terms "unit" or "module" do not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module", or divided into a larger number of elements, "unit", or "module". Moreover, the elements and "units" or "modules" may be implemented to reproduce one or more CPUs within a device or a security multimedia card.

A terminal described in this specification may include one or more of a mobile phone, a smart phone, a laptop computer, a user electronic device for digital broadcasting, a Personal Digital Assistant (PDA), a Portable Multimedia Player (PMP), and a navigation device. However, it is apparent to those skilled in the art that a configuration according to embodiments provided in the present specifications are also applied to a terminal such as a digital TV, a desktop computer, and the like, excluding a case that is only applicable to a mobile terminal.

FIG. 1 is a block diagram illustrating a configuration of a terminal according to an embodiment of the present invention.

Referring to FIG. 1, a terminal 100 includes a wireless communication unit 110, an Audio/Video (A/V) input unit 120, a user input unit 130, a sensing unit 140, an output unit 150, a memory 160, an interface unit 170, a controller 180, a power supplier 190, and the like. The component elements illustrated in FIG. 1 may not be essential and more or fewer component elements may be embodied.

The wireless communication unit 110 includes one or more modules capable of establishing wireless communication between the terminal 100 and a wireless communication system, or between the terminal 100 and a network in which the terminal 100 is located. For example, the wireless communication unit 110 includes a broadcast reception module 111, a mobile communication module 112, a wireless Internet module 113, a short-range communication module 114, and a location information module 115.

The broadcast receiving module 111 receives a broadcast signal and/or broadcast-related information from an external broadcast management server through a broadcast channel. The broadcast channel includes a satellite channel and a terrestrial channel. In order to perform simultaneous broadcast reception or broadcast channel switching with respect to at least two broadcasting channels, two or more broadcasting reception modules may be provided to the terminal 100.

The broadcast manager server refers to a server that generates and transmits a broadcasting signal and/or broadcasting related information, or a server that is provided with a generated broadcasting signal and/or broadcasting related information, and transmits the same to a terminal. Examples of the broadcast signal include not only a TV broadcast signal, a radio broadcast signal, and a data broadcast signal, but also a broadcast signal in the form of a combination of a TV broadcast signal or a radio broadcast signal with a data broadcast signal.

The broadcast-related information refers to information related to a broadcast channel, a broadcast program, or a broadcast service provider. The broadcast-related information may also be provided through a mobile communication network. In this case, the broadcast-related information may be received by the mobile communication module 112.

The broadcast-related information exists in various forms. For example, the broadcasting related information is in a form such as an Electronic Program Guide (EPG) of a Digital Multimedia Broadcasting (DMB) or an Electronic Service Guide (ESG) of a Digital Video Broadcast-Handheld (DVB-H).

The broadcast receiving module 111, for example, receives a digital broadcast signal by using a digital broadcasting system, such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), Integrated Services Digital Broadcast-Terrestrial (ISDB-T), and the like. The broadcasting reception module 111 may be configured to be appropriate for another broadcasting system, in addition to the described digital broadcasting system.

A broadcast signal and/or broadcast-related information received through the broadcast receiving module 111 are stored in the memory unit 160.

The mobile communication module 112 transmits and receives a wireless signal to/from at least one of a base station, an external terminal, and a server over a mobile communication network, such as Global System for Mobile communications (GSM), Code Division Multiple Access (CDMA), and Wideband CDMA (WCDMA), but are not limited thereto. The wireless signal includes a voice call signal, a video call signal, or data in various forms according to the transmission and reception of text/multimedia messages.

The wireless Internet module 113 refers to a module for wireless Internet connection, and may be contained inside or outside the terminal 100. Wireless Internet connection may be made through wireless Internet technologies, such as Wireless Local Area Network (WLAN) (i.e., Wi-Fi), Wireless broadband (Wibro), World Interoperability for Microwave Access (Wimax), High Speed Downlink Packet Access (HSDPA), GSM, CDMA, WCDMA, Long Term Evolution (LTE), but are not limited thereto, and the like.

When a wireless Internet connection according to Wibro, HSDPA, GSM, CDMA, WCDMA, LTE, and the like, is made through a mobile communication network, the wireless Internet module 113 which performs a wireless Internet connection through the mobile communication network may be understood as a type of mobile communication module 112.

The short-range communication module 114 refers to a module for short-range communication. Here, the short-range communication technology adopts Bluetooth, Radio Frequency Identification (RFID), infrared Data Association (IrDA), Ultra Wideband (UWB), ZigBee, and the like.

The location information module 115 refers to a module for obtaining a location of a terminal, for example, a Global Position System (GPS) module. According to the current technology, the location information module 115 calculates information on a distance between the terminal and each of three or more satellites and information on an accurate time point at which the distance information has been measured, applies trigonometry to the calculated distance information and time information, and thereby accurately calculates three-dimensional (3D) current location information according to latitude, longitude and altitude. Currently, the method has been widely used for calculating location and time information by using three satellites and correcting errors of the calculated location and time information by using another satellite. Also, the location information module 115 continuously calculates a current location in real time, and thus, may calculate speed information.

Referring to FIG. 1, the Audio/Video (A/V) input unit 120 is used to input an audio signal or a video signal, and includes a camera 121, a microphone 122, and the like. The camera 121 processes an image frame such as a still image, a video, and the like, obtained by an image sensor in a video call mode or a photographing mode. The processed image frame may be displayed on a display unit 151.

The image frame processed in the camera 121 is stored in the memory 160, or transmitted outside the wireless communication unit 110. Two or more cameras 121 may be included based on a service environment.

The microphone 122 receives an input of an external sound signal through a microphone and processes the signal into electrical voice data, in a call mode, a recording mode, a voice recognition mode, and the like. In the call mode, the processed voice data is converted into a form that can be transferable to a mobile communication base station through the mobile communication module 112, and is output. In the microphone 122, various noise removal algorithms may be embodied for removing noise generated during a process of receiving an external sound signal.

The user input unit 130 generates input data for a user to control operations of a terminal. The user input unit 130 is configured to include buttons 136 disposed on the front, back, or lateral sides of the terminal 100, and a touch sensor (resistive/capacitive) 137. Although not illustrated, the user input unit 130 may be configured to further include a keypad, a dome switch, a jog wheel, a jog switch, and the like.

The sensing unit 140 detects a current state of the terminal 100, such as an open/close state of the terminal 100, a location of the terminal 100, contact or non-contact between a user and the terminal 100, a compass direction of the terminal, and acceleration/deceleration of the terminal, and generates a sensing signal for controlling an operation of the terminal 100. For example, when the terminal 100 is a slide phone, the sensing unit 140 senses whether the slide phone is opened or closed. The sensing unit 140 also senses whether the power supplier 190 supplies power, whether the interface unit 170 is coupled with an external device, and the like. The sensing unit 140 includes a proximity sensor 141.

The output unit 150 generates an output related to the sense of sight, the sense of hearing, the sense of touch, and the like, and includes a display unit 151, a sound output module 152, an alarm unit 153, a haptic module 154, and the like.

The display unit 151 displays (outputs) information processed by the terminal 100. For example, when the terminal is in a call mode, the display unit 151 displays a User Interface (UI) or a Graphic User Interface (GUI) associated with a call. When the terminal 100 is in a video call mode or in an image capturing mode, the display unit 151 displays a captured and/or received image, a UI, or a GUI.

The display unit 151 includes at least one of a Liquid Crystal Display (LCD), a Thin Film Transistor-Liquid Crystal Display (TFT LCD), an Organic Light-Emitting Diode (OLED) display, a flexible display, and a 3D display.

The display unit 151 may be implemented in a transparent type or a light transmission type so that the outside can be seen therethrough. The transparent-type display includes a Transparent OLED (TOLED). A rear structure of the display unit 151 may also be a transparent type. Through the structure, the user may view a subject that is located behind a terminal body through an area occupied by the display unit 151 of the terminal body.

The terminal 100 may include two or more display units 151 according to an implementation form thereof. For example, multiple display units are disposed to be spaced apart from each other or to be integrated with each other on one surface of the terminal 100, or are disposed on different surfaces of the terminal 100.

When the display unit 151 and the touch sensor 137 form a layer structure or are formed to be integrated (hereinafter, referred to as a "touch screen"), the display unit 151 is used as an input device, in addition to an output device. The touch sensor may be formed to be a laminate with the display unit 151 in the case of, for example, touch films, touch sheets, touch pads, or the like, or may be integrally formed with the display unit 151.

The touch sensor 137 is configured to convert a pressure applied to a particular part of the display unit 151 or a change in capacitance and the like generated at the particular part thereof, into an electrical input signal. The touch sensor 137 is configured to detect a pressure of a touch, as well as a position and an area of the touch.

When the touch sensor 137 senses a touch input, signal(s) corresponding to the touch input is delivered to a touch controller. The touch controller processes the signal(s), and then transmits data corresponding to the processed signal(s) to the controller 180. Accordingly, the controller 180 determines which area of the display unit 151 has been touched, etc., based on the received data.

The proximity sensor 141 may be disposed in an internal area of the terminal 100 which is enclosed by the touch screen 137, or may be disposed near the touch screen 137. The proximity sensor 141 refers to a sensor that detects whether an object that approaches a predetermined side for detection or an object adjacent to the side exists, using an electromagnetic field force or infrared light, without a mechanical contact. The proximity sensor 141 has a longer lifecycle and higher utilization than a contact type sensor.

The proximity sensor includes a transparent photoelectric sensor, a direct reflective photoelectric sensor, a mirror reflective photoelectric sensor, a high-frequency oscillation proximity sensor, a capacitive proximity sensor, a magnetic proximity sensor, an infrared proximity sensor, and the like. When the touch screen is a capacitive type, it is configured to detect the proximity of a pointer based on a change in a magnetic field which occurs as the pointer approaches. In this case, the touch screen (touch sensor) is classified as a proximity sensor.

Hereinafter, for convenience of description, an action of causing a pointer to be recognized as being located in close proximity to a touch screen without contacting the touch screen is referred to as a "proximity touch." An action of causing the pointer to actually contact the touch screen is referred to as a "contact touch." A proximity touch point of the pointer on the touch screen denotes the point on the screen which vertically corresponds to the location of the pointer in the proximity touch.

The proximity sensor detects a proximity touch, and a proximity touch pattern (for example, a proximity touch distance, a proximity touch direction, a proximity touch speed, a proximity touch time, a proximity touch location, and a proximity touch movement state). Information corresponding to a detected proximity touch motion and a proximity touch pattern may be output on the touch screen.

The sound output module 152 outputs audio data that is received from the wireless communication unit 110 or is stored in the memory 160, in a call signal reception mode, a call mode, a recording mode, a voice recognition mode, a broadcasting reception mode, and the like. The sound output module 152 outputs a sound signal associated with a function (for example, a call signal reception sound, a message reception sound, and the like) executed in the terminal 100. The sound output module 152 includes a receiver, a speaker, a buzzer, and the like.

The alarm unit 153 outputs a signal for informing the user that an event of the terminal 100 has occurred. The event occurring in the terminal includes reception of a call signal, reception of a message, input of a key signal, input of a touch, and the like. The alarm unit 153 outputs not only a video signal or an audio signal, but also other types of signals, for example, a signal for notifying the occurrence of an event through vibration. The video signal or the audio signal may also be output from the display unit 151 or the voice output module 152. Accordingly, in this case, the display unit 151 and the voice output module 152 are classified as a kind of alarm unit 153.

The haptic module 154 generates various tactile effects that the user can feel. The tactile effects generated by the haptic module 154 include vibration. It is possible to control the intensity, pattern, and the like, of vibration generated by the haptic module 154. For example, different vibrations are output after being combined, or sequentially output.

The haptic module 154 generates various tactile effects, including not only vibration, but also an effect of stimulus according to the arrangement of pins vertically moving with respect to a skin surface being contacted, an effect of stimulus according to a jet force or suction force of air through an injection hole or a suction hole, an effect of stimulus of touching a skin surface, an effect of stimulus according to contact of an electrode, an effect of stimulus using an electrostatic force, an effect according to the reproduction of a cool or warm feeling using an element capable of absorbing or radiating heat, and the like.

The haptic module 154 is implemented not only to deliver a tactile effect through direct contact, but also to enable the user to feel a tactile effect through a kinesthetic sense of the user's finger, arm, and the like. Two or more haptic modules 154 may be included based on a configuration pattern of the terminal 100.

The memory unit 160 stores programs for processing and controls performed by the controller 180, or temporarily stores input/output data (e.g., a phone book, a message, audio, a still image, a moving image, etc.). The memory unit 160 stores the frequency of use of each piece of data (e.g., the frequency of use of each phone number, that of each message, and that of each multimedia).

The memory unit 160 also stores data associated with vibrations and sounds of various patterns output when a touch is input to the touch screen.

The memory unit 160 includes at least one type of storage medium of a flash memory type, a hard disk type, a multimedia card micro type, a card type memory (for example, an SD memory, an XD memory, and the like), a Random Access Memory (RAM), a Static RAM (SRAM), a Read-Only Memory (ROM), an Electrically Erasable Programmable ROM (EEPROM), a PROM, a magnetic memory, a magnetic disk, and an optical disk. The terminal 100 may operate in association with a web storage that executes a storage function of the memory unit 160 on the Internet.

The interface unit 170 acts as a path to all external devices connected to the terminal 100. The interface unit 170 receives data from an external device, receives power and transmits the received power to each element inside the terminal 100 or transmits data within the terminal 100 to an external device. For example, a wired/wireless headset port, an external charger port, a wired/wireless data port, a memory card port, a port used for connecting a device equipped with an identification module, an audio Input/Output (I/O) port, a video Input/Output (I/O) port, an earphone port, and the like, may be included in the interface unit 170.

According to an embodiment of the present invention, the terminal 100 is connected with an external display unit through the interface unit 170, and the controller 180 controls a display method of the external display unit.

The identification module is a chip that stores various sets of information for authenticating authority for use of the terminal 100, and includes a User Identity Module (UIM), a Subscriber Identity Module (SIM), a Universal Subscriber Identity Module (USIM), and the like. The device equipped with the identification module (hereinafter, "identification device") may be manufactured in the form of a smart card. Therefore, the identification device may be connected with the terminal 100 through a port.

When the terminal 100 is connected with an external cradle, the interface unit is a path through which power from the cradle is supplied to the terminal 100, or a path through which various command signals input by a user through the cradle may be transferred to the terminal. The various command signals or power input from the cradle operate as signals used for recognizing that the terminal is accurately installed in the cradle.

The controller 180 generally controls a general operation of the terminal. For example, the controller 180 performs related control and processing for a voice call, data communication, a video call, and the like. The controller 180 includes a multimedia module 181 for reproducing multimedia. The multimedia module 181 may be implemented within the controller 180, or may be implemented separately from the controller 180.

The controller 180 performs a pattern recognition processing capable of recognizing a handwriting input or a picture-drawing input, which is received through the touch screen, as a character and an image, respectively.

The controller 180 further includes a scroll distance determination unit 182 capable of determining an available scroll distance in a page displayed by an application based on an input through the user input unit 130.

When an input for moving a page is input, the scroll distance determination unit 182 determines an available scroll distance on the user input unit 130 or the corresponding display unit 151. The determination of the distance is performed based on an available drag input distance or a speed of a fling input.

The power supplier 190 supplies power required for operations of component elements by receiving power from the outside and inside according to the control of the controller 180. The power supplier 190 includes, for example, a battery, a connection port, a power supply controller, and a charging monitoring unit.

The battery may be an embedded battery which is rechargeable, or may be coupled with a terminal body to be detachable for charging and the like. The connection port may be configured as an example of the interface 170 to which an external charger that supplies power for charging a battery is electrically connected.

The various embodiments described herein may be implemented in, for example, a recording medium readable by a computer or an apparatus similar to the computer by using software, hardware, or some combinations thereof.

For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and other electrical units for executing functions. In some cases, the embodiments described in the present specification may be implemented by the controller 180 itself.

For software implementation, the embodiments such as procedures and functions described in this specification may be implemented by separate software modules. The software modules may perform one or more functions and operations described in the present specification. A software code may be implemented by a software application written in an appropriate programming language. The software code may be stored in the memory 160, and may be implemented by the controller 180.

Figure 2:
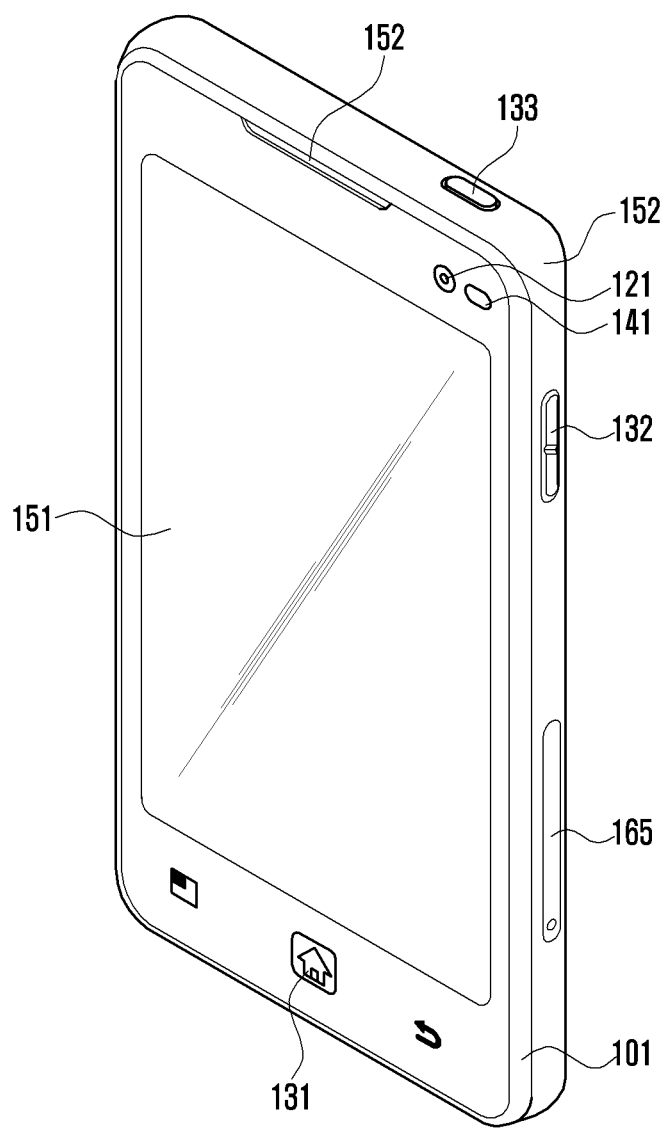
FIG. 2 is a front perspective view of the terminal according to an embodiment of the present invention.
Figure 3:
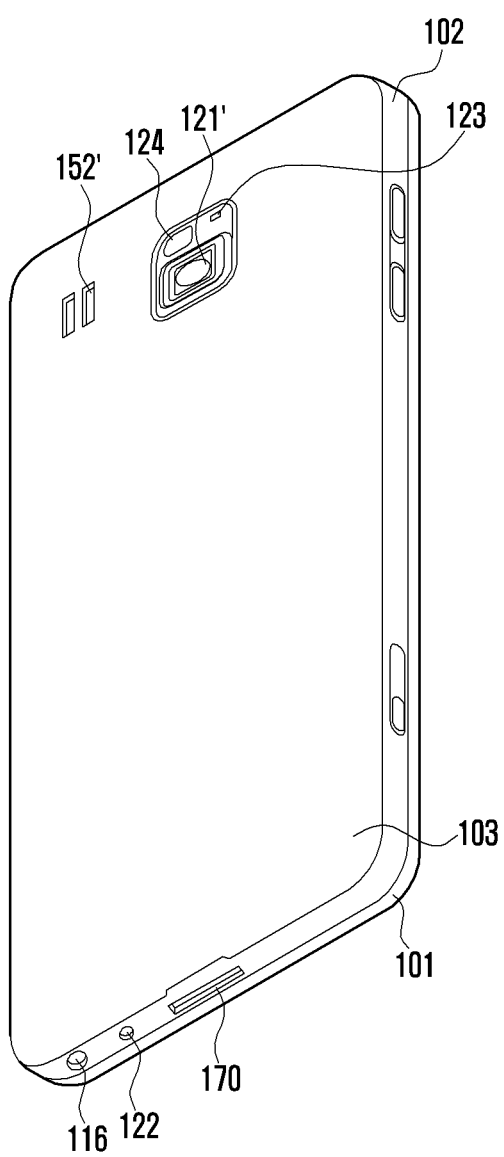
FIG. 3 is a rear perspective view of the terminal according to an embodiment of the present invention.

FIG. 2 is a front perspective view illustrating one example of the terminal or the portable terminal related to the present invention. FIG. 3 is a rear perspective view of the terminal illustrated in FIG. 2.

Referring to FIGS. 2 and 3, the terminal 100 includes the terminal body shaped like a bar, but is not limited thereto. Various structures may be applied, such as a slide type, a folder type, a swing type, a swivel type, and the like, that include two or more bodies coupled to move in a relative manner.

The body of the terminal 100 includes cases 101, 102, and 103 that form an exterior. In the present embodiment, the cases may be distinguished into the front case 101 and a rear case 102. Various electronic components are included in a space formed between the front case 101 and the rear case 102.

For a component that may be detachable like a substorage medium 165 such as a USIM card, a memory card, and the like, the case includes an opening part through which the component is inserted into the inside of the case from an external side. A slot is formed on a lateral side of the case so that the sub-storage medium 165 is inserted from the lateral side of the terminal 100 and is contained in the terminal, or card slots are formed on a surface of the rear case 102.

The cases 101, 102, and 103 may be formed by catapulting synthetic resins, or may be formed of metal such as stainless steel (STS), titanium (Ti), and the like.

On the case 101 and 102 of the terminal, the display unit 151, the sound output unit 152, the camera 121, the user input units 131, 132, and 133, the microphone 122, the interface 170, and other components may be disposed.

The display unit 151 occupies most of the front case 101. The sound output unit 152 and the camera 121 are disposed on an area adjacent to one of the two ends of the display unit 151, and the user input unit 131 and the microphone 122 are disposed on an area adjacent to the other end. The user input unit 132, the interface 170, and the like, are disposed on lateral sides of the front case 101 and the rear case 102.

The user input units 131, 132 and 133 are manipulated to receive a command for controlling operations of the terminal 100, and include a plurality of manipulation units 131, 132 and 133. The manipulation units 131, 132 and 133 are commonly called manipulating portions.

The content input by a first manipulation unit 131 or a second manipulation unit 132 may be variously set. For example, the first manipulation unit 131 receive various commands, such as a command for starting, ending, scrolling, and the like, the second manipulation unit 132 receives a commands for controlling the volume of a sound output from the sound output unit 152, and the third manipulation unit 133 receives a command to activate/deactivate the touch recognition mode of the display unit 151 and the like.

The manipulation units 131, 132 and 133 may be based on a button scheme that recognizes a command when a user applies pressure, or may include a touch sensor in manipulation units 131, 132 and 133, in addition to in the display unit 151, so as to receive an input of a command with only a touch of a user.

A camera 121' is installed on the back side of the terminal body, that is, the rear case 102. The camera 121' is a camera that has a substantially reverse photographing direction of the camera 121, and has identical or different number of pixels to/from the camera 121.

For example, the camera 121 has a low number of pixels so as to photograph a face of a user and to readily transmit the photographed image to a partner, when a video call and the like is performed; and the camera 121' has a high number of pixels since the camera 121' usually does not transmit a photographed image immediately after photographing a general subject. The cameras 121 and 121' are installed in the terminal body to be rotated or popped-up.

A flash 123 and a mirror 124 are disposed near the camera 121'. The flash flashes light toward a subject when the subject is photographed by the camera 121'. When a user desires to photograph himself/herself using the camera 121', the user views their own face reflected by the mirror 124.

A sound output unit 152' is disposed on the back side of the terminal body. The sound output unit 152' of the back side of the body may embody a stereo function together with the sound output unit 152 of the front side of the body, and may be used for embodying a speaker phone for calling.

On a lateral side of the terminal body, a broadcasting signal reception antenna 116 is disposed, in addition to an antenna for calling. The antenna 116 that configures a part of the broadcasting reception module 111 of FIG. 1 may be withdrawn from the terminal body.

For convenience of description, it is assumed that the terminal 100 referred below includes at least one of the component elements illustrated in FIG. 1.

FIGS. 4A to 4C are diagrams illustrating one example of a scroll method according to an embodiment of the present invention.

Referring to FIGS. 4A to 4C, a terminal 400 includes a display unit 410. The display unit 410 includes a touch screen according to an embodiment of the present invention. A user may make a corresponding input based on the display unit 410 according to the touch screen.

In the embodiment of the present invention, the user performs a first touch 420, and moves a position of the first touch 420 in a predetermined direction. More particularly, the user performs a drag input 435 for moving the first touch 420 to a position of a second touch 430 while maintaining the first touch 420. In this case, according to an embodiment of the present invention, the terminal 400 scrolls a page displayed based on a drag distance of the drag input 435.

Further, according to an embodiment of the present invention, the terminal performs a fling input 445 for performing a drag input and then a release input 440. According to an embodiment of the present invention, the terminal 400 scrolls a page displayed based on a movement speed of a predetermined section before the release of the fling input 445.

In the embodiment of the present invention, it is possible to calculate a scroll distance based on a movement distance of the drag input 435. The terminal scrolls the page by a distance corresponding to the drag distance, and, for example, the terminal scrolls a page by the same length as the drag distance.

Further, in the embodiment of the present invention, it is possible to calculate a scroll distance based on a movement speed at the time of the release input 440 when the fling input 445 is applied. More particularly, it is possible to determine the scroll distance based on the movement speed applied within a predetermined time zone or movement area before the release input 440, and it is possible to determine the scroll distance in response to the speed of the fling input.

Figure 5:
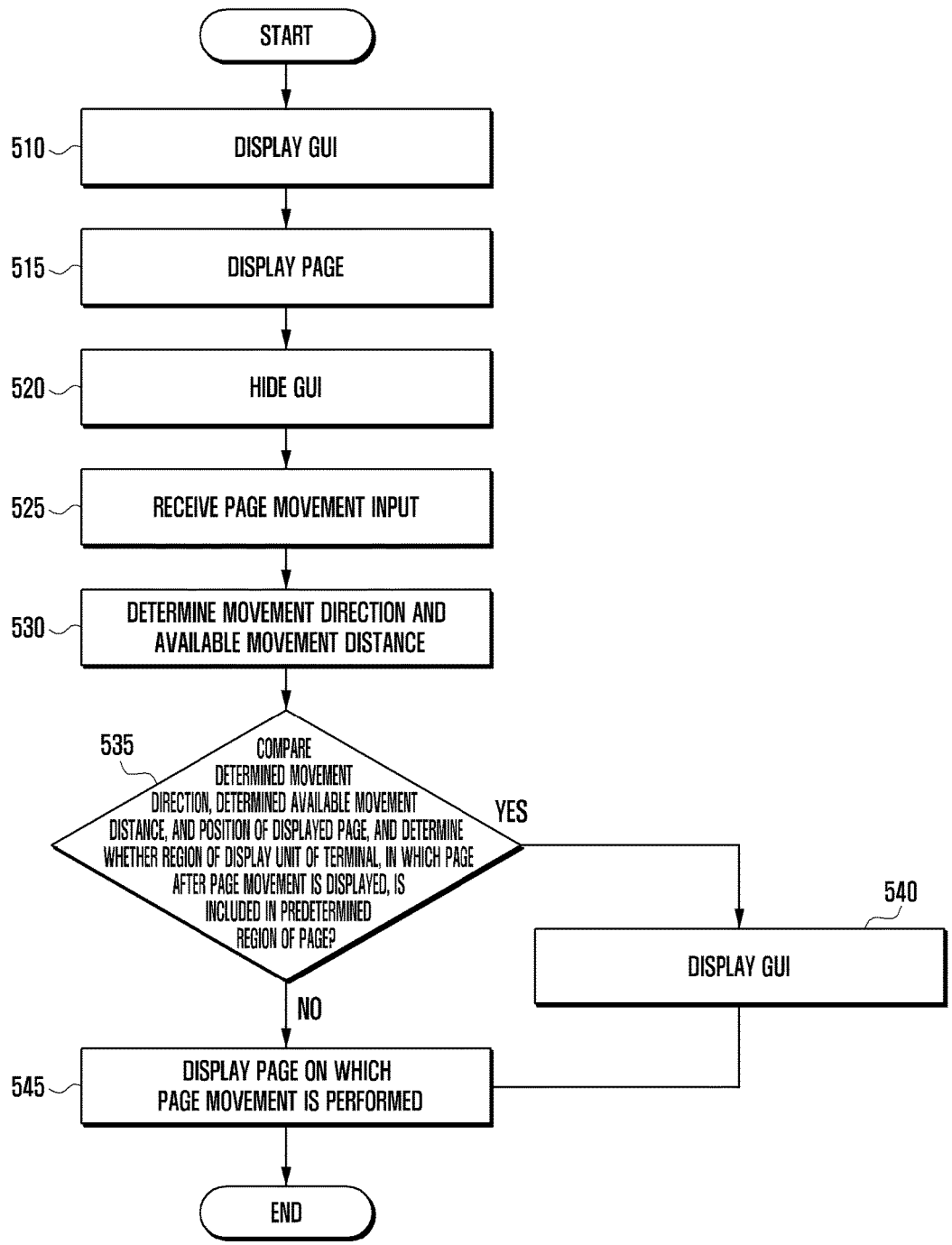
FIG. 5 is a flowchart illustrating a method of displaying a GUI according to an embodiment of the present invention.

FIG. 5 is a flowchart illustrating a method of displaying a GUI according to an embodiment of the present invention.

Referring to FIG. 5, the terminal displays a GUI on the display unit in step 510. The GUI includes a window for an input by a user and a separate window capable of providing the user with information. More particularly, the GUI includes one or more of a URL window for inputting a URL, a search window for inputting a search word, and a text window for inputting a text. The separate window may further include one or more of a window for displaying a state of the terminal and a setting window for setting an operation method of the terminal. In the embodiment of the present invention, the method is described based on the method of displaying the GUI on the display unit of the terminal, but may include a method of displaying and controlling the GUI displayed on an external display unit connected with the terminal.

According to an embodiment of the present invention, the terminal displays the GUI on a predetermined area of the display unit. In the embodiment of the present invention, when the displayed GUI is the URL window, the user may input an address of a page desired to be displayed on the URL window.

The terminal displays a page in step 515. The displayed page is determined according to an input by the user or the setting of the terminal. More particularly, the page corresponding to the address of the page input on the URL window displayed in step 510 is displayed on the display unit. When the page is displayed, the GUI is displayed on the display unit together or displayed to overlap the display unit.

The terminal hides the GUI in step 520. When a specific condition is satisfied, the terminal hides the GUI. The specific condition includes one or more of elapse of a predetermined time, performance of a page movement, and a separate touch input.

The terminal receives a page movement input of the terminal in step 525. According to an embodiment of the present invention, the terminal receives the page movement input based on a method including one or more of a drag input, a movement input, and a fling input. In the embodiment of the present invention, the page movement input is generated by at least one of an air gesture, a motion, a touch by an input means, and a hovering by an input means. The input means includes an input means capable of performing a physical or electric contact, and more particularly, the input means includes a pen or a user body.

The terminal determines a movement direction and an available movement distance based on the page movement input in step 530. According to an embodiment of the present invention, the movement direction is determined based on one or more of a direction of the drag input and a direction of the fling input. The available movement distance is determined based on one or more of a distance of the drag input and a speed of the fling input. More particularly, when the drag input is applied, it is possible to determine a maximally available movement distance according to the drag input based on a size of the input unit of the terminal. The available movement distance is determined based on the distance. When the fling input is applied, an available movement distance is determined according to the speed.

In step 535, the terminal compares the determined movement direction, the determined available movement distance, and a position of the currently displayed page, and determines whether a region of the display unit of the terminal, in which the page after the page movement is displayed, is included in a predetermined region of the page when performing the page movement according to the drag input, the movement, or the fling input. In the embodiment of the present invention, the input for the page movement includes a user input detectable by the terminal.

According to the embodiment of the present invention, the predetermined region includes an upper or a lower end of the page. In another embodiment of the present invention, the predetermined region includes 15% or lower of an upper or lower portion of the page. According to the embodiment of the present invention, the predetermined region is formed by a distance between specific coordinates on the page and the currently displayed position, and the specific coordinates are set according to the setting by the user or designated as a predetermined value in the terminal.

As a result of the determination, when the region of the display unit of the terminal, in which the page after the page movement is displayed, is included in the predetermined region of the page, the terminal displays the GUI in step 540. The terminal may further perform page movement while displaying the GUI. The GUI is displayed on a region separate from the contents of the page, or displayed to overlap the contents of the page. Further, according to an embodiment of the present invention, the GUI is displayed with a first size when first displaying the GUI, and displayed with a second size larger than the first size in the case where the page movement input continues.

As a result of the determination, when the region of the display unit of the terminal, in which the page after the page movement is displayed, is not included in the predetermined region of the page, the terminal performs the page movement and displays a page, on which the page movement has been performed, in step 545.

Figure 6:
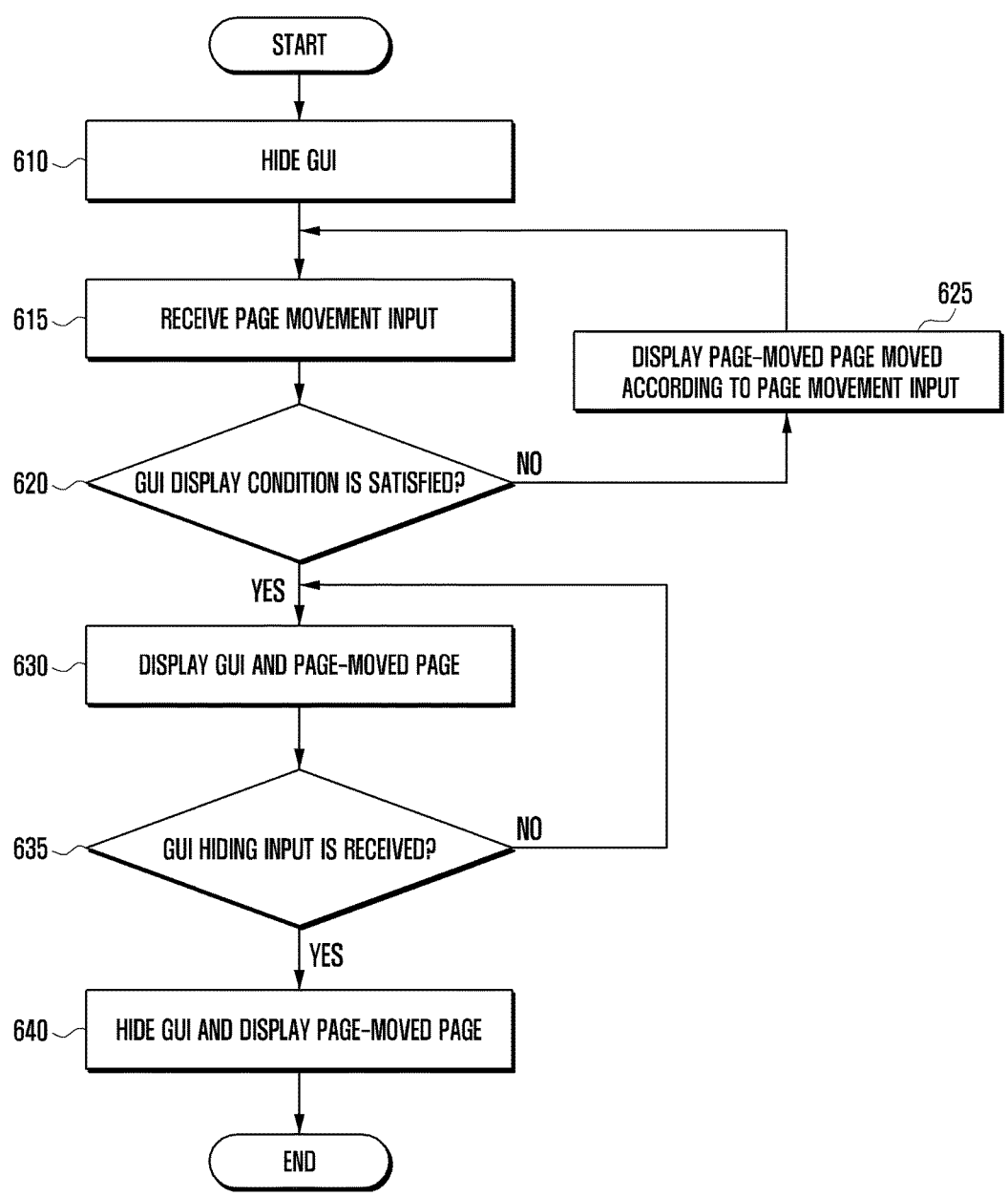
FIG. 6 is a flowchart illustrating another method of displaying a GUI according to an embodiment of the present invention.

FIG. 6 is a flowchart illustrating another method of displaying a GUI according to an embodiment of the present invention.

Referring to FIG. 6, the terminal hides a GUI in step 610. A condition of hiding the display of the GUI is similar to that of step 520 of FIG. 5.

The terminal receives a page movement input of the terminal in step 615. The page movement input is similar to that of step 525 of FIG. 5.

The terminal determines whether a GUI display condition is satisfied in step 620. An operation of determining whether the GUI display condition is satisfied is similar to that of steps 530 and 535 of FIG. 5.

When the condition is not satisfied, the terminal displays a moved page according to the page movement input in step 625.

When the condition is satisfied, the terminal displays a moved page together with the GUI in step 630. This operation is similar to that of steps 540 and 545 of FIG. 5.

The terminal determines whether a GUI hiding input is received in step 635. According to an embodiment of the present invention, the GUI hiding input includes a change of the direction of the drag into an opposite direction when the GUI is displayed during the performance of the page movement according to the drag input. According to another embodiment of the present invention, the GUI hiding input includes displaying the GUI during the performance of the page movement according to the fling input, and receiving a separate touch input during the performance of the page movement when the GUI is displayed.

When the GUI hiding input is received, the terminal hides the GUI, which is displayed in step 630, and displays the moved page in step 640. When the GUI hiding input is not received, the terminal continues displaying the GUI and the moved page in step 630.

As described above, through hiding the GUI according to the GUI hiding input, it is possible to prevent the GUI from being displayed when the user does not desire to display the GUI.

Figure 7A:
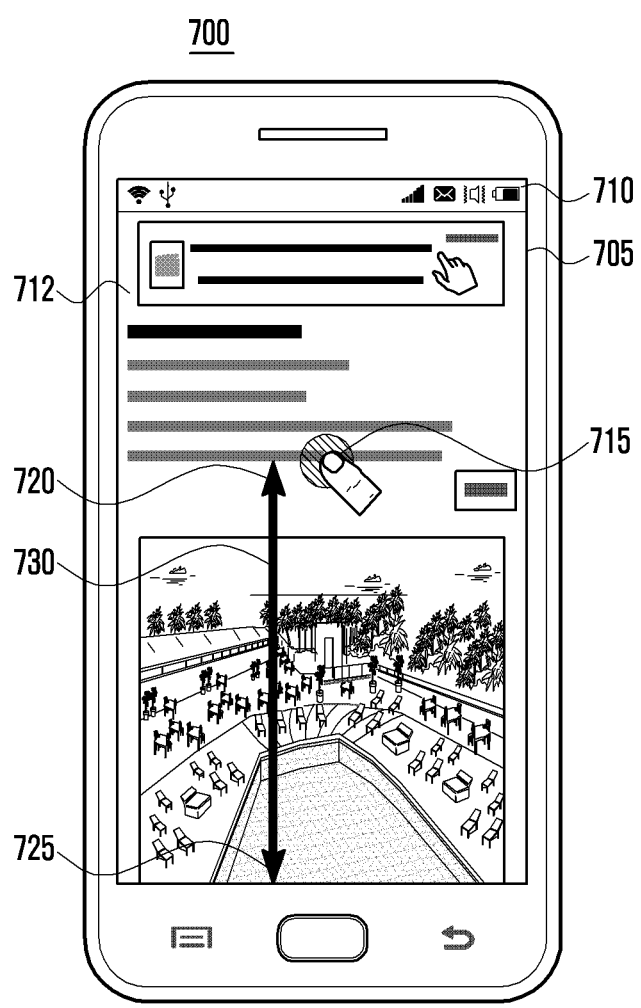
FIGS. 7A to 7D are diagrams illustrating a method of displaying a GUI according to an embodiment of the present invention.
Figure 7B:
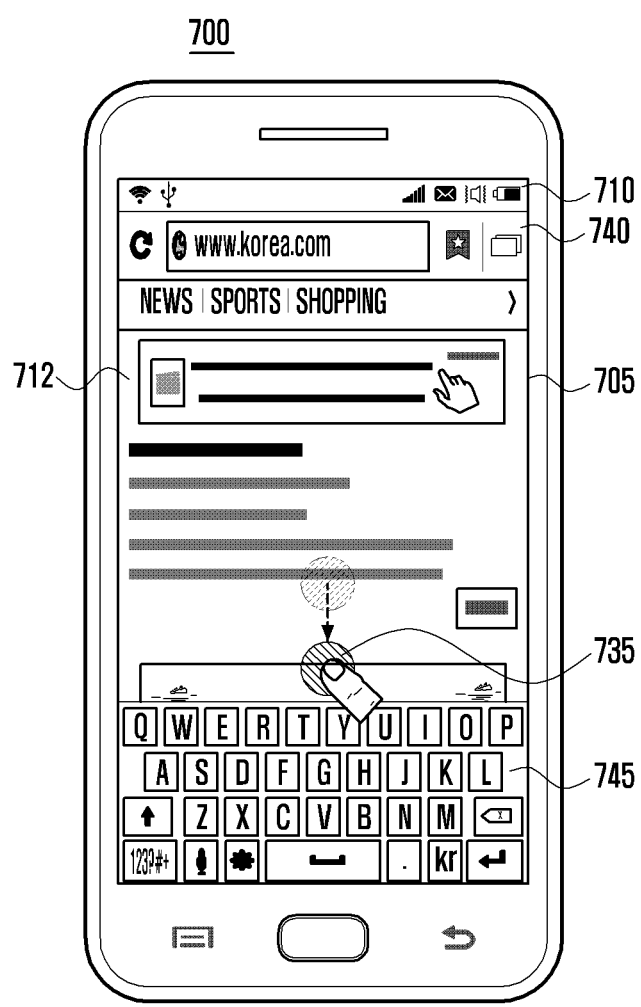
Figure 7C:
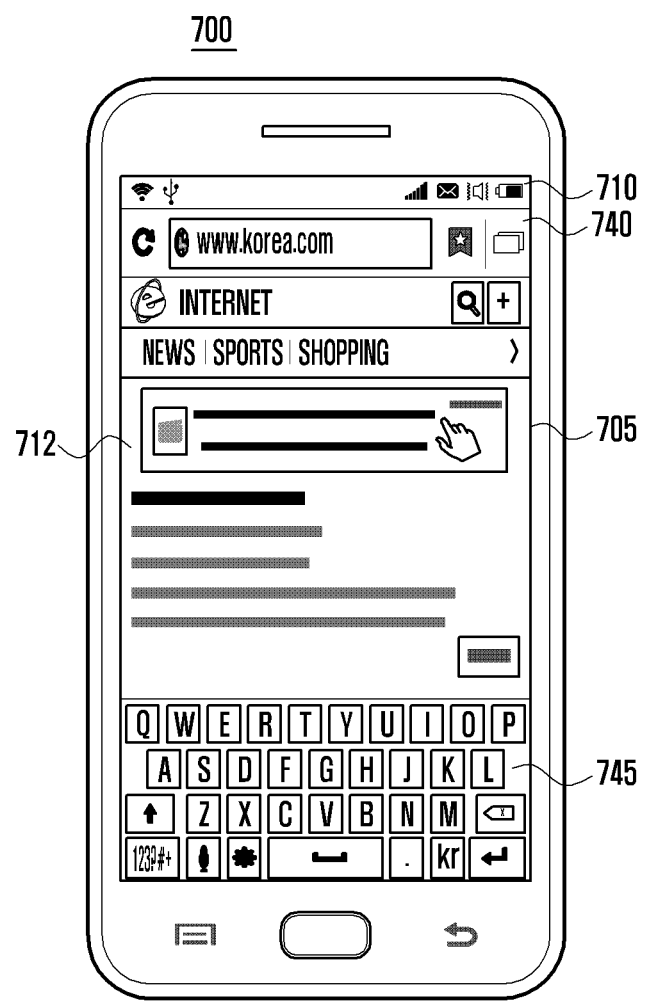
Figure 7D:
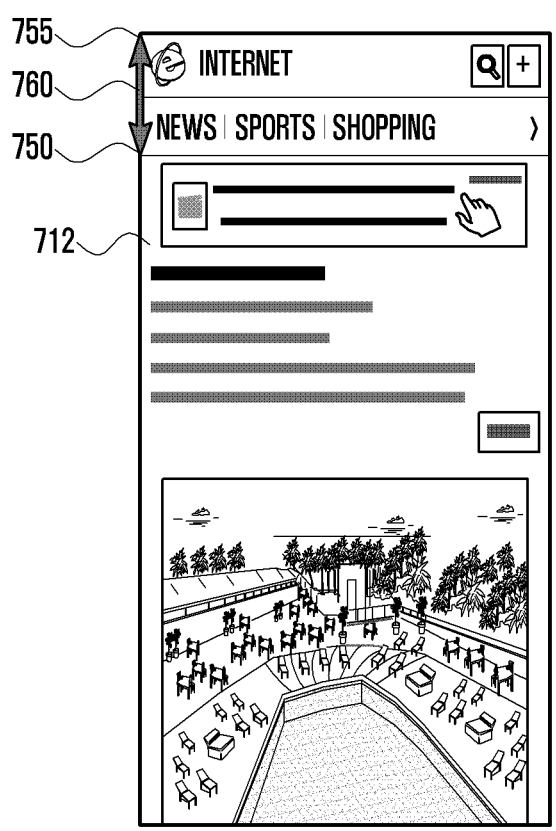

FIGS. 7A to 7D are diagrams illustrating a method of displaying a GUI according to an embodiment of the present invention. More particularly, FIGS. 7A to 7C are diagrams illustrating a terminal displaying a page, and FIG. 7D is a diagram illustrating the displayed page. Here, the page displayed on the terminal in FIGS. 7A to 7C is same as or similar to that of FIG. 7D.

Referring to FIGS. 7A to 7C, the terminal 700 displays a state display region 710 and a page display region 712 on the display unit 705, and displays a page displayed by an application on the page display region 712.

Referring to FIGS. 7A and 7B, the user performs a drag input (i.e., a page movement input) through a first input 715 and a second input 735. The terminal 700 determines a page available movement distance when moving the page by the drag through the first input 715 and the second input 735. The page available movement distance is a distance between a start point 720 to an end point 725 of a display unit 705 of the terminal 700 or an input unit corresponding to the display unit 705. In the embodiment of the present invention, the first input 715 includes a touch input, and the second input 735 includes a releasing input.

A region of a currently displayed page in FIG. 7A is a region starting from a position 750 of FIG. 7D, and can be moved to a region starting from the uppermost point 755 of FIG. 7D. Accordingly, a remaining movement available length of the current page in FIG. 7A is indicated by reference numeral 760 of FIG. 7D.

In the embodiment of the present invention, when a page available movement distance 730 of FIG. 7A is larger than the remaining movement available length 760 of FIG. 7D, the terminal 700 displays a GUI 740, as shown in FIGS. 7B and 7C. According to an embodiment of the present invention, the terminal 700 displays an input GUI 745, as shown in FIGS. 7B and 7C, together with the GUI 740.

More particularly, when the drag input is received, the terminal 700 compares a size of reference numeral 730 of FIG. 7A and a size of reference numeral 760 of FIG. 7D, and when the size of reference numeral 730 of FIG. 7A is larger than the size of reference numeral 760 of FIG. 7D, the terminal 700 displays the GUI 740. According to an embodiment of the present invention, when the size of reference numeral 730 of FIG. 7A is larger than the size of reference numeral 760 of FIG. 7D by a predetermined value or greater, the terminal 700 displays the GUI 740. Then, the terminal 700 displays a moved page according to the page movement input, such as shown in FIG. 7C.

FIGS. 8A to 8D are diagrams illustrating a method of displaying a GUI according to another embodiment of the present invention.

Referring to FIGS. 8A to 8D, a terminal 800 displays a state display region 810 and a page display region 815 on a display unit 805, and displays a page displayed by an application on the page display region 815.

Figure 8A:
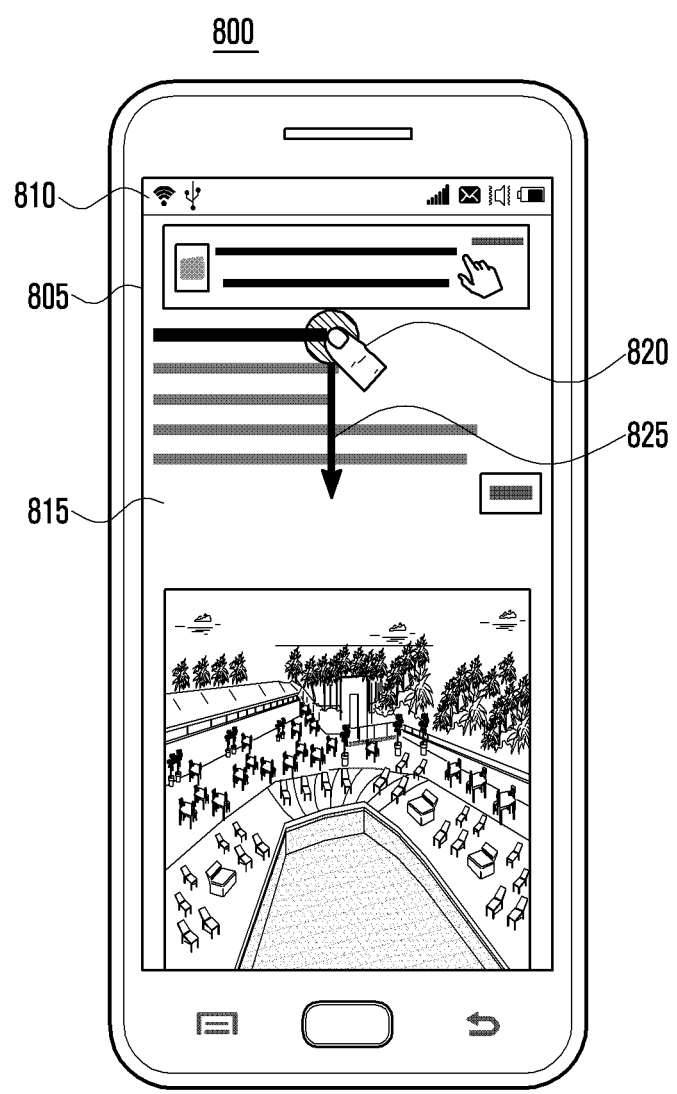
FIGS. 8A to 8D are diagrams illustrating a method of displaying a GUI according to another embodiment of the present invention.
Figure 8B:
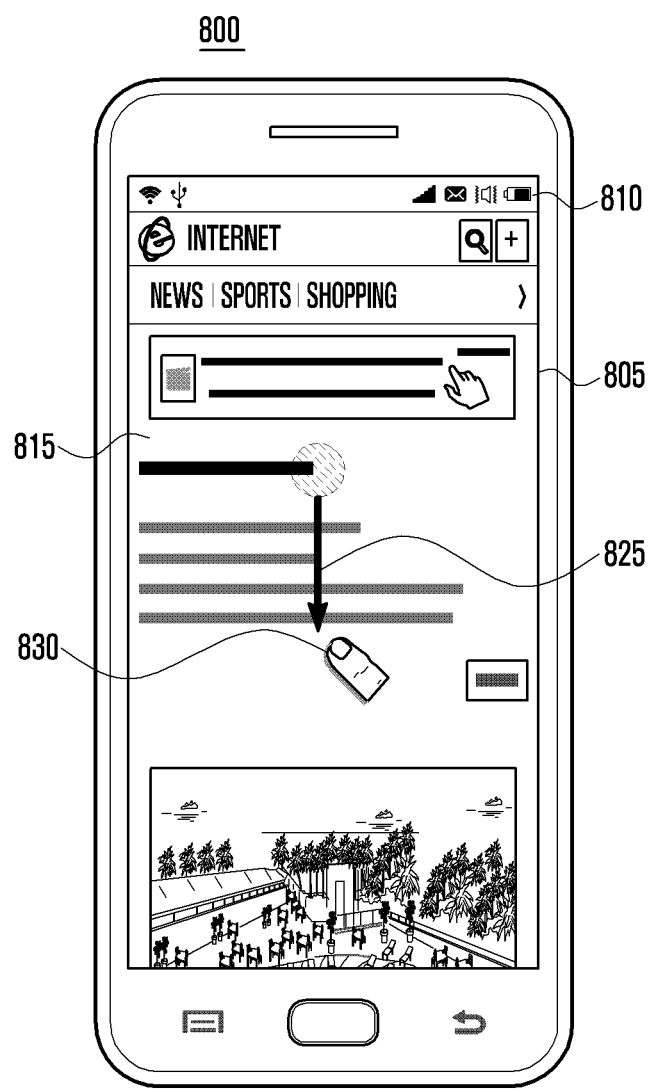

Referring to FIGS. 8A and 8B, the user performs a fling input (i.e., a page movement input) through a first input 820 and a releasing input 830. The user performs the fling input by dragging the first input 820 in a down direction 825 while touching the first input 820, and then performing the releasing input 830. According to the embodiment of the present invention, the terminal 800 determines a scroll distance based on a speed of the movement in the down direction 825.

Figure 8C:
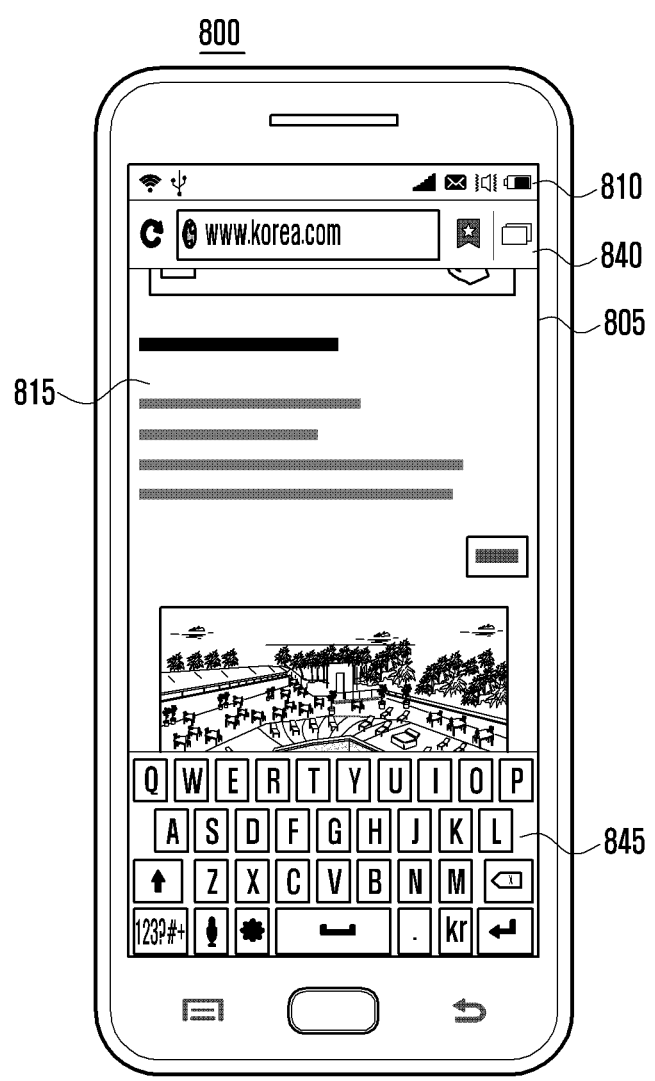
Figure 8D:
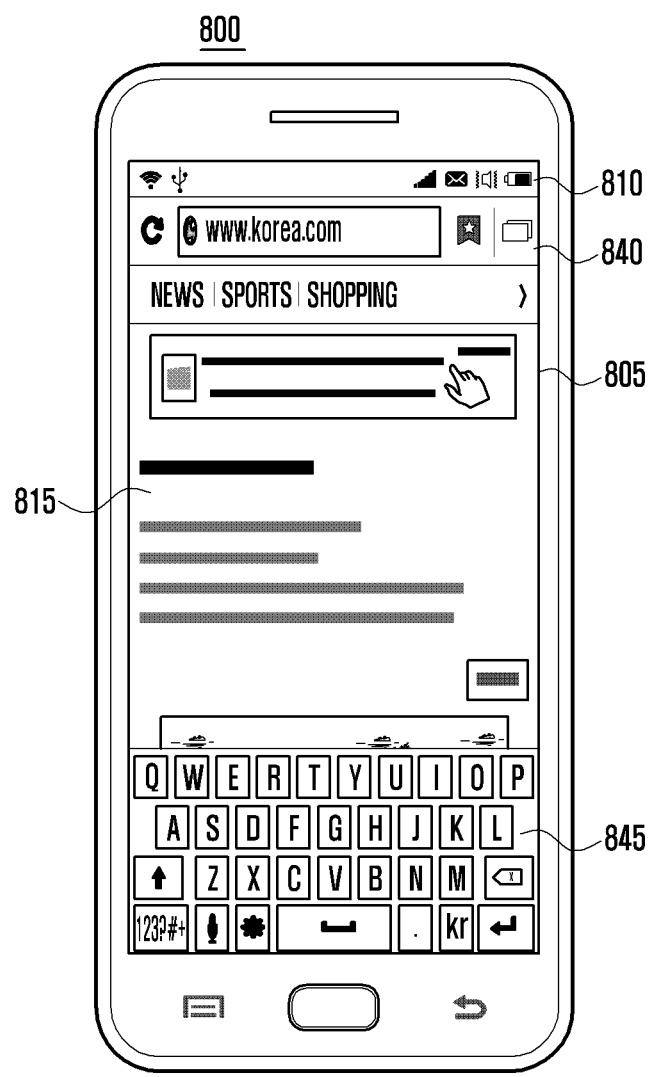

In the embodiment of the present invention, at a position of the page displayed in FIG. 8A, when the distance from the currently displayed upper end to the uppermost end of the page is smaller than a page movement distance according to the fling input, the terminal displays the GUI 840 as shown in FIGS. 8C and 8D, even when the page movement according to the fling input is not completed. According to the embodiment of the present invention, the terminal 800 displays an input GUI 845 as shown in FIGS. 8C and 8D together with the GUI 840. In the embodiment of the present invention, the display of the GUI 840 and the input GUI 845 is similarly performed as the method illustrated in FIGS. 7A to 7C.

FIGS. 9A to 9D are diagrams illustrating a method of displaying a GUI according to an embodiment of the present invention.

Referring to FIGS. 9A to 9D, a terminal 900 displays a state display region 910 and a page display region 915 on a display unit 905, and displays a page displayed by an application on the page display region 915.

Figure 9A:
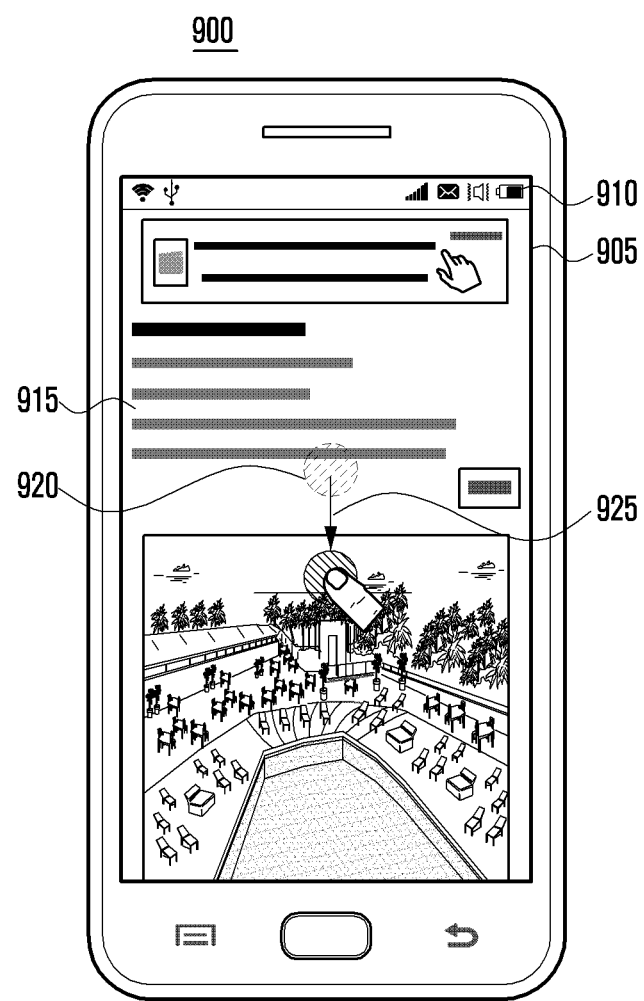
FIGS. 9A to 9D are diagrams illustrating a method of displaying a GUI according to an embodiment of the present invention.
Figure 9B:
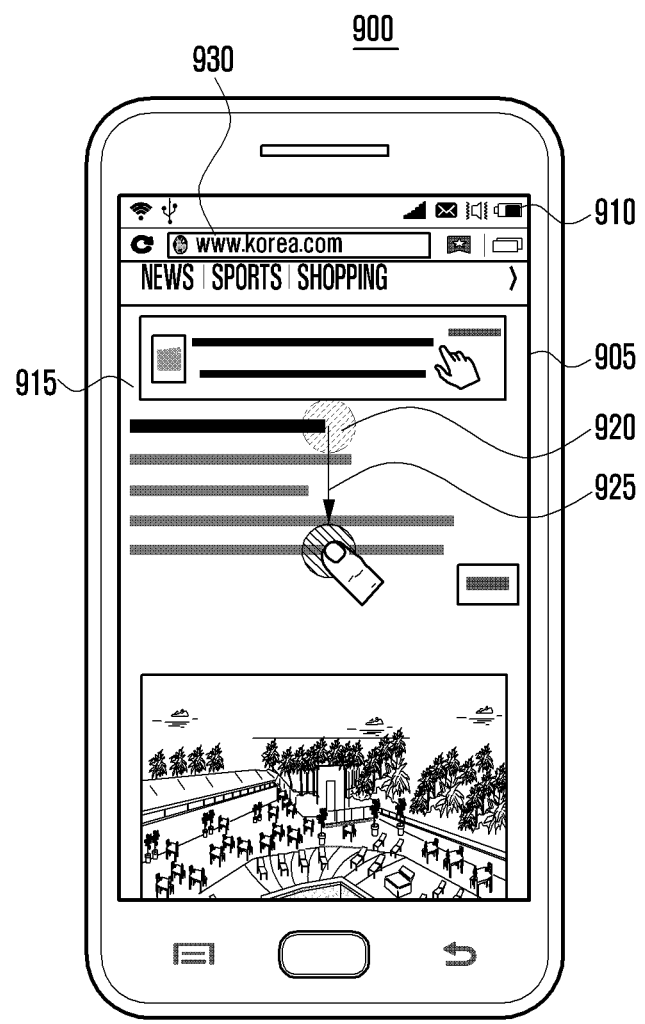
Figure 9C:
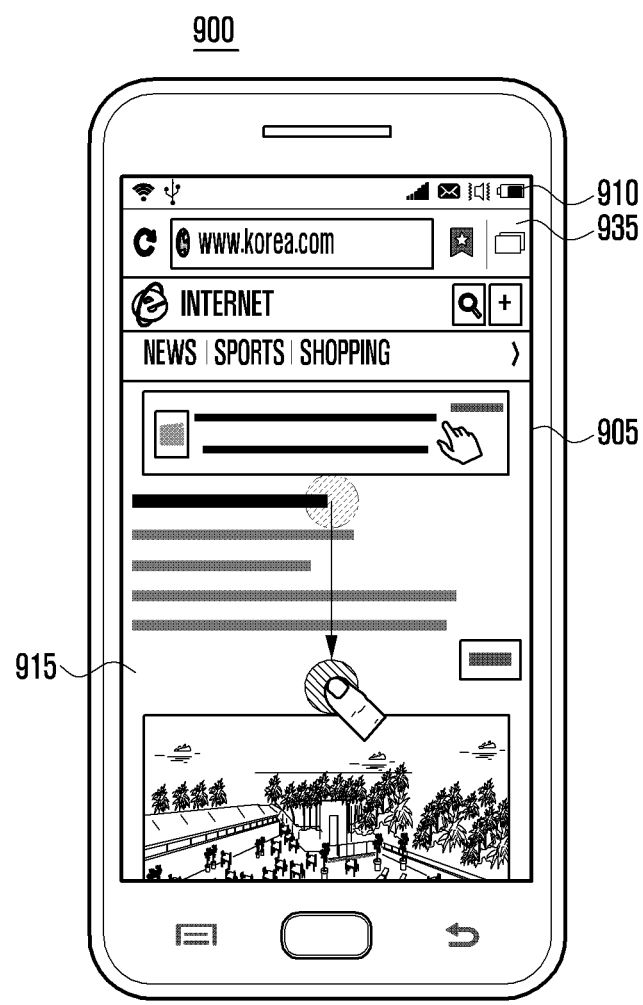
Figure 9D:
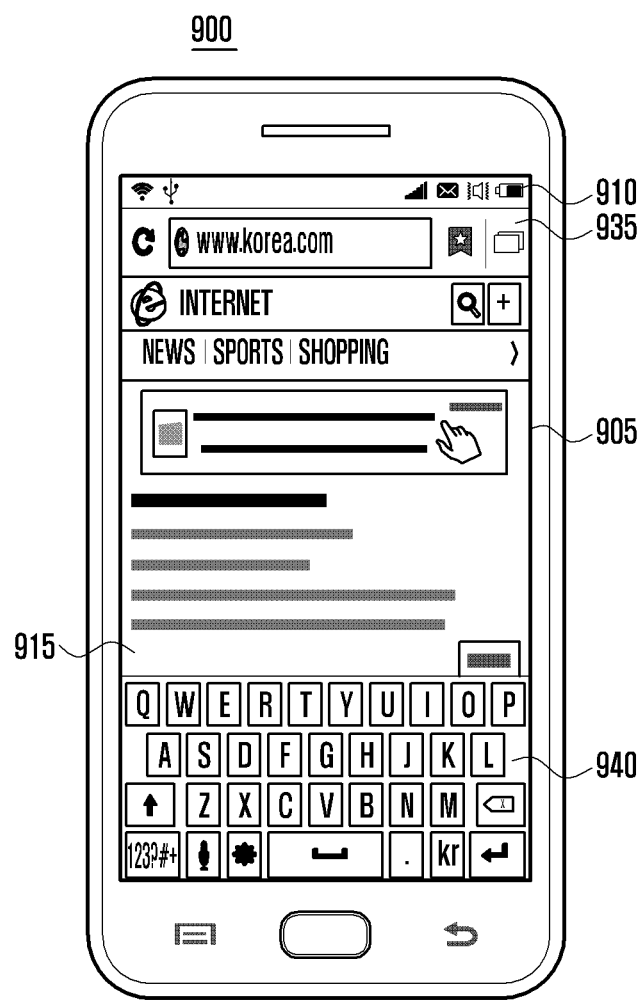

Referring to FIG. 9A, the user performs a first input 920 on the terminal 900. When a drag input 925 is performed in a down direction according to the first input 920, the terminal 900 moves the page displayed on the display unit 905. When an available movement distance according to the drag input 925 is shorter than a distance from the currently displayed upper end to the uppermost end of the page, the terminal 900 displays a GUI 930 with a first size as shown in FIG. 9B. When the drag input is continued from FIG. 9B to FIG. 9C, the terminal 900 displays a GUI 935 with a second size as shown in FIG. 9C. Here, the second size is larger than the first size. In the embodiment of the present invention, when the user stops the drag or performs the drag in an opposite direction in FIG. 9B, the terminal 900 hides the GUI 930 of FIG. 9B again. According to the embodiment of the present invention, the terminal 900 displays an input GUI 940 as shown in FIG. 9D together with the GUI 935.

Although embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out without departing from the scope of the present invention as defined by the appended claims and their equivalents.

What is claimed is:

1. A method of displaying a page, the method comprising:
   detecting an input for moving a page;
   determining a first length and an available scroll distance based on characteristics of the detected input, wherein the first length is a distance between a first coordinate of the page and the currently displayed position of the page;
   determining that the available scroll distance is greater than or equal to the first length;
   displaying a Graphic User Interface (GUI) based on the determination that the available scroll distance is greater than or equal to the first length.

2. The method of claim 1, wherein displaying the GUI further includes receiving information related to the specific coordinates of the page.

3. The method of claim 1, wherein displaying the GUI further includes displaying the GUI with a first size according to the input for moving the page, and displaying the GUI with a larger size than the first size when the input for moving the page is continued.

4. The method of claim 1, wherein the input for moving the page includes one or more of a drag input, a fling input, and a movement input.

5. The method of claim 4, further comprising hiding the displayed GUI when an additional drag input in a direction opposite to a direction of the drag input is received.

6. The method of claim 4, further comprising:
   performing a scroll according to the fling input; and
   hiding the displayed GUI when an additional touch input is received during the performance of the scroll.

7. The method of claim 4, wherein determining the available scroll distance includes determining a scroll length corresponding to the drag input with a maximum length inputtable to the terminal from a position, at which the drag input is first applied, as the available scroll distance.

8. The method of claim 4, wherein determining the available scroll distance includes determining a scroll length corresponding to the fling input with a maximum speed inputtable to the terminal according to the fling input as the available scroll distance.

9. The method of claim 4, wherein the input for moving the page is an input generated by one or more of an air gesture, a motion, a touch by an input means, and a hovering by an input means.

10. A terminal for displaying a page, the terminal comprising:
    an input unit configured to detect an input for moving a page displayed on a display unit of the terminal or an external display unit connected with the terminal; and
    a controller configured to:
       determine a first length and an available scroll distance based on characteristics of the detected input, wherein the first length is a distance between specific coordinates of the page and the currently displayed position of the page,
       determine that the available scroll distance is greater than or equal to the first length; and
       display a Graphic User Interface (GUI) based on the determination that the available scroll distance is greater than or equal to the first length.

11. The terminal of claim 10, wherein the controller is further configured to receive information related to the specific coordinates of the page.

12. The terminal of claim 10, wherein the controller is further configured to display the GUI with a first size according to the input for moving the page, and to display the GUI with a larger size than the first size when the input for moving the page is continued.

13. The terminal of claim 10, wherein the input for moving the page includes one or more of a drag input, a fling input, and a movement input.

14. The terminal of claim 13, wherein when an additional drag input in a direction opposite to a direction of the drag input is received, the controller is further configured to hide the displayed GUI.

15. The terminal of claim 13, wherein the display unit is further configured to perform a scroll according to the fling input, and
    wherein the controller is further configured to hide the displayed GUI when an additional touch input is received during the performance of the scroll.

16. The terminal of claim 13, wherein the controller is further configured to determine a scroll length corresponding to the drag input with a maximum length inputtable to the terminal from a position, at which the drag input is first applied, as the available scroll distance.

17. The terminal of claim 13, wherein the controller is further configured to determine a scroll length corresponding to the fling input with a maximum speed inputtable to the terminal according to the fling input as the available scroll distance.

18. The method of claim 13, wherein the input for moving the page is an input generated by one or more of an air gesture, a motion, a touch by an input means, and a hovering by an input means.

* * * * *